US010795651B2

(12) United States Patent
Wang et al.

(10) Patent No.: US 10,795,651 B2
(45) Date of Patent: Oct. 6, 2020

(54) METHOD AND APPARATUS FOR COMPILING SOURCE CODE OBJECT, AND COMPUTER (71) Applicant: Huawei Technologies Co., Ltd., Shenzhen (CN)

(72) Inventors: Haichuan Wang, Santa Clara, CA (US); Brice Adam Dobry, Santa Clara, CA (US); Shiqiang Cui, Shenzhen (CN); Bo Qi, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/396,289

(22) Filed: Apr. 26, 2019

(65) Prior Publication Data

US 2019/0250894 A1 Aug. 15, 2019

Related U.S. Application Data (63) Continuation of application No. PCT/CN2017/092856, filed on Jul. 13, 2017.

(30) Foreign Application Priority Data

Oct. 28, 2016 (CN) .......................... 2016 1 0967074

(51) Int. Cl.
G06F 8/41 (2018.01)
G06F 9/52 (2006.01)

(52) U.S. Cl.
CPC .............. G06F 8/4434 (2013.01); G06F 8/41 (2013.01); G06F 9/52 (2013.01)

(58) Field of Classification Search
CPC ... G06F 9/52; G06F 8/41; G06F 8/443; G06F 8/4434
(Continued)

(56) References Cited

U.S. PATENT DOCUMENTS 5,206,951 A * 4/1993 Khoyi ....................... G06F 8/76
719/315
5,226,161 A * 7/1993 Khoyi ....................... G06F 8/76
719/316
(Continued)

FOREIGN PATENT DOCUMENTS

CN 1961292 A 5/2007
CN 101046755 A 10/2007
(Continued)

OTHER PUBLICATIONS

Liu et al., "Research on Memory Management During Developing IOS," (Mar. 2013).
(Continued)

Primary Examiner — Marina Lee
(74) Attorney, Agent, or Firm — Leydig, Voit & Mayer, Ltd.

(57) ABSTRACT

Compiling source code objects to improve efficiency of compiling is described herein. The compiling includes determining, by a compiler, an object type of a to-be-compiled object in source code. A counter is set for the to-be-compiled object. When the object type of the to-be-compiled object is an object type that can be operated by only one thread at one moment, the compiler sets a counter counting rule for the counter of the to-be-compiled object.

8 Claims, 4 Drawing Sheets (58) Field of Classification Search
USPC .................................................. 717/100–161
See application file for complete search history.

(56) References Cited

U.S. PATENT DOCUMENTS

| | | | | |
|---|---|---|---|---|
| 6,026,401 | A * | 2/2000 | Brealey | ..................... G06F 9/52 |
| 6,826,752 | B1 | 11/2004 | Thornley et al. | |
| 10,268,525 | B2 * | 4/2019 | Beckett | ................... G06F 9/541 |
| 2001/0025295 | A1 * | 9/2001 | Kawachiya | ............... G06F 9/52 |
| | | | | 718/106 |
| 2002/0100033 | A1 * | 7/2002 | Halstead, Jr. | ......... G06F 9/4488 |
| | | | | 717/162 |
| 2005/0081010 | A1 * | 4/2005 | DeWitt, Jr. | ........... G06F 11/348 |
| | | | | 711/165 |
| 2005/0081019 | A1 * | 4/2005 | DeWitt, Jr. | ......... G06F 9/30181 |
| | | | | 712/227 |
| 2005/0273782 | A1 * | 12/2005 | Shpeisman | ............... G06F 9/52 |
| | | | | 718/100 |
| 2005/0289546 | A1 * | 12/2005 | Shpeisman | ............... G06F 9/52 |
| | | | | 718/100 |
| 2006/0242628 | A1 | 10/2006 | Plesko et al. | |
| 2007/0203960 | A1 | 8/2007 | Guo | |
| 2012/0096449 | A1 * | 4/2012 | Yang | ........................ G06F 8/65 |
| | | | | 717/168 |
| 2012/0167106 | A1 | 6/2012 | Shpeisman et al. | |
| 2012/0233445 | A1 * | 9/2012 | Zhang | .................... G06F 9/321 |
| | | | | 712/220 |
| 2013/0212568 | A1 | 8/2013 | Huang et al. | |
| 2019/0250894 | A1 * | 8/2019 | Dobry | ....................... G06F 8/41 |

FOREIGN PATENT DOCUMENTS

| | | |
|---|---|---|
| CN | 100474252 C | 4/2009 |
| CN | 102968302 A | 3/2013 |

OTHER PUBLICATIONS

Duanxz, "Synchronized two: the principle of synchronization," retrieved from the Internet: https://www.cnblogs.com/duanxz/p/4745871.html, pp. 1-14 (Posted on Aug. 20, 2015).

* cited by examiner

METHOD AND APPARATUS FOR COMPILING SOURCE CODE OBJECT, AND COMPUTER

CROSS-REFERENCE TO RELATED APPLICATIONS

This application is a continuation of International Application No. PCT/CN2017/092856, filed on Jul. 13, 2017, which claims priority to Chinese Patent No. 201610967074.1, filed on Oct. 28, 2016. The disclosures of the aforementioned applications are hereby incorporated by reference in their entireties.

TECHNICAL FIELD

The present invention relates to the field of computer technologies, and in particular, to a method and an apparatus for compiling a source code object, and a computer.

BACKGROUND

At present, a working process of developer-oriented programming software is mainly as follows: first receiving source code that is input by a developer; then compiling the source code, where the compiling process is specifically converting the source code into machine-recognizable target code; and finally executing the target code to implement a corresponding function.

In practical application, multiple objects are defined in the source code that is input by the developer, and the object is an entity that is obtained by encapsulating data and a related operation. To help manage a memory, a compiler that performs the compiling operation usually uses the following method to compile each object in the source code: first allocating a counter to each object and then setting a counting rule for each counter. The counting rule may be specifically as follows: When it is detected that a corresponding object is cited by a thread, a value of the counter increases by 1; and when it is detected that a corresponding object is released by a thread, a value of the counter decreases by 1, and when a value of a counter of an object is 0, memory space occupied by the object is released.

In a terminal, most threads run in parallel. Therefore, when the foregoing method is used, one object may be simultaneously cited by multiple threads in an execution phase of the target code. To ensure exclusivity of each thread for a cited object, in a compiling phase of the source code, in addition to setting an operation rule for the counter of each object, a locking rule and an unlocking rule are set for the counter of each object. The locking rule may be specifically as follows: When it is detected that a current object is cited by a thread, the counter is locked, and in this case, threads other than the current thread cannot operate the object. The unlocking rule may be specifically as follows: When it is detected that the current object is released by the foregoing thread, the counter is unlocked, and in this case, any thread can cite the current object. In practical application, there are thousands of objects defined in the source code. Therefore, using the foregoing compiling method results in low efficiency for compiling the objects in the source code.

SUMMARY

Embodiments of the present invention provide a method and an apparatus for compiling a source code object, and a computer, to improve efficiency for compiling an object in source code.

According to a first aspect, the present invention provides a method for compiling a source code object, where the method includes: determining, by a compiler, an object type of a to-be-compiled object in source code, where a counter is set for the to-be-compiled object; and when the object type of the to-be-compiled object is a type that can be operated by only one thread at one moment, setting, by the compiler, a counter counting rule for the counter of the to-be-compiled object. The counter counting rule may be specifically as follows: When it is detected that a corresponding object is cited by a thread, a value of the counter increases by 1; and when it is detected that a corresponding object is released by a thread, a value of the counter decreases by 1, and when a value of a counter of an object is 0, memory space occupied by the object is released.

With reference to the first aspect, in a first possible implementation, the method further includes: when the object type of the to-be-compiled object is a type that can be simultaneously operated by multiple threads at one moment, setting, by the compiler, a counter counting rule, a counter locking rule, and a counter unlocking rule for the counter of the to-be-compiled object. The counter locking rule may be specifically as follows: When it is detected that a current object is cited by a thread, the counter is locked, and in this case, threads other than the current thread cannot operate the object. The counter unlocking rule may be specifically as follows: When it is detected that the current object is released by the foregoing thread, the counter is unlocked, and in this case, any thread can cite the current object.

With reference to the first aspect or the first possible implementation of the first aspect, in a second possible implementation, the determining, by a compiler, an object type of a to-be-compiled object in source code includes: determining, by the compiler, whether the to-be-compiled object is a parent object or a child object; when determining that the to-be-compiled object is the parent object, determining, by the compiler, the object type of the to-be-compiled object according to an object identifier of the to-be-compiled object, where the object identifier is an identifier preset for the to-be-compiled object when the source code is compiled, and different identifiers correspond to different object types; and when the to-be-compiled object is the child object, determining, by the compiler, that the object type of the to-be-compiled object is an object type of a parent object of the to-be-compiled object.

With reference to the first aspect or the first possible implementation of the first aspect, in a third possible implementation, the determining, by a compiler, an object type of a to-be-compiled object in source code includes: obtaining, by the compiler, the object identifier of the to-be-compiled object, where the object identifier is preset for the to-be-compiled object when the source code is compiled; and determining, by the compiler, the object type of the to-be-compiled object according to the object identifier of the to-be-compiled object.

With reference to the first aspect, or the first possible implementation, or the second possible implementation, or the third possible implementation of the first aspect, in a fourth possible implementation, the method further includes: obtaining, by the compiler from the source code, operation code associated with the to-be-compiled object; determining, by the compiler according to a type of the operation code associated with the to-be-compiled object, whether the object type of the to-be-compiled object is set correctly; and sending, by the compiler, alarm information when the object type of the to-be-compiled object is set incorrectly.

According to a second aspect, an object processing method is provided, and the method includes: setting, by a compiler, a counter for an object; and when a type of the object is a type that can be operated by only one thread at one moment, performing, by the compiler, a counting operation on the counter of the object, and skip performing a counter locking operation and a counter unlocking operation.

With reference to the second aspect, in a first possible implementation of the second aspect, the method further includes: when the object type of the object is a type that can be simultaneously operated by multiple threads at one moment, performing, by the compiler, a counting operation on the counter of the object, and performing a counter locking operation and a counter unlocking operation.

According to a third aspect, an apparatus for compiling a source code object is provided, and the apparatus includes: a determining unit, configured to determine an object type of a to-be-compiled object in source code, where a counter is set for the to-be-compiled object; and a first setting unit, configured to: when the object type of the to-be-compiled object is a type that can be operated by only one thread at one moment, set a counter counting rule for the counter of the to-be-compiled object.

With reference to the third aspect, in a first possible implementation, the apparatus further includes: a second setting unit, configured to: when the object type of the to-be-compiled object is a type that can be simultaneously operated by multiple threads at one moment, set a counter counting rule, a counter locking rule, and a counter unlocking rule for the counter of the to-be-compiled object.

With reference to the third aspect or the first possible implementation of the third aspect, in a second possible implementation, the determining unit is specifically configured to: determine whether the to-be-compiled object is a parent object or a child object; when determining that the to-be-compiled object is the parent object, determine the object type of the to-be-compiled object according to an object identifier of the to-be-compiled object, where the object identifier is an identifier preset for the to-be-compiled object when the source code is compiled; and when the to-be-compiled object is the child object, determine that the object type of the to-be-compiled object is an object type of a parent object of the to-be-compiled object.

With reference to the third aspect or the first possible implementation of the third aspect, in a third possible implementation, the apparatus further includes an alarm unit, configured to: obtain from the source code, operation code associated with the to-be-compiled object; determine, according to a type of the operation code associated with the to-be-compiled object, whether the object type of the to-be-compiled object is set correctly; and send alarm information when the object type of the to-be-compiled object is set incorrectly.

According to a fourth aspect, an object processing apparatus is provided, and the apparatus includes: a setting unit, configured to set a counter for an object; and a first execution unit, configured to: when a type of the object is a type that can be operated by only one thread at one moment, execute a counting rule for the counter of the object, and skip performing a counter locking operation and a counter unlocking operation.

With reference to the fourth aspect, in a first possible implementation of the fourth aspect, the apparatus further includes: a second execution unit, configured to: when the object type of the object is a type that can be simultaneously operated by multiple threads at one moment, perform a counting operation on the counter of the object, and perform a counter locking operation and a counter unlocking operation.

According to a fifth aspect, a computer is provided, including a processor, a memory, and a bus, where the memory is configured to store a computer executable instruction; and the processor is connected to the memory by using the bus, and is configured to execute the computer executable instruction stored in the memory, so that the compiler executes the method for compiling a source code object disclosed in the first aspect, or executes the object processing method disclosed in the second aspect.

It can be learned from the foregoing description that, in the embodiments of the present invention, the object in the source code is preset, according to the operation code associated with the source code, as the type that can be operated by multiple threads at one moment, or the type that can be operated by only one thread at one moment. For example, when the operation code associated with the object is serial code, the object type of the object is set as the type that can be operated by only one thread at one moment. When the operation code associated with the object is parallel code, the object type of the object is set as the type that can be operated by multiple threads at one moment. In addition, when compiling the object in the source code and determining that a current to-be-compiled object is of the type that can be operated by only one thread at one moment, the compiler sets only a counter counting rule for a counter of the to-be-compiled object, and does not set a counter locking rule and a counter unlocking rule. Relative to the prior art in which a counter counting rule, a counter locking rule, and a counter unlocking rule are set for a counter of each object in the source code, compiling efficiency is improved. Moreover, for an object that is operated by only one thread at one moment, operation code associated with the object is serial code, and then in an execution phase of target code, the foregoing object can be operated by only one thread at one moment. Therefore, using the method of the present invention may also ensure exclusivity of each thread for operation object at any moment. In conclusion, according to the present invention, compiling efficiency can be improved on the basis of ensuring exclusivity of each thread for the operation object.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention.

Figure 1:
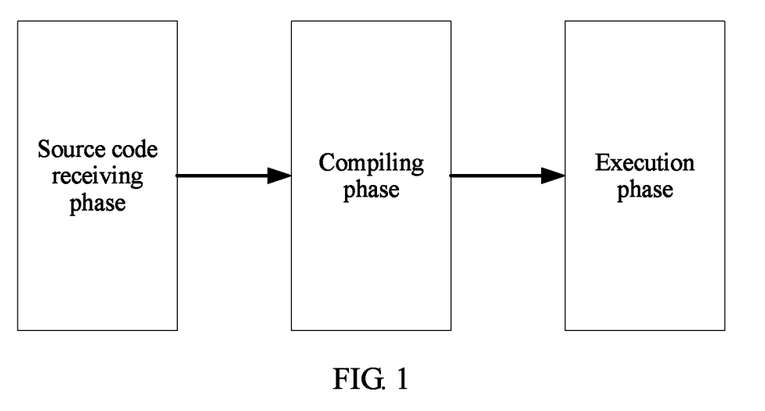
FIG. 1 is a schematic diagram of an entire programming process according to an embodiment of the present invention.

The present invention first provides a method for compiling a source code object, and an application scenario of the method is as follows:

At present, as shown in FIG. 1, a working process of developer-oriented programming software is mainly divided into three phases: a source code receiving phase, a compiling phase, and an execution phase.

A terminal running the programming software may specifically provide a human-computer interaction interface. A programmer may input source code in the interaction interface, and the terminal running the programming software may receive the source code that is input by the programmer. Generally, the source code that is input by the programmer mainly includes two parts: an object and operation code specifically. The object is an entity that is obtained by encapsulating data and a related operation, and the operation code is specifically code of an operation object. For example, in the source code, an object a may be defined, and an operation of executing computation on the object a, for example, a+1, may be specifically operation code of the object a. The operation code may be specifically parallel code or serial code. The serial code means that operation code associated with an object runs in series. For example, operation code of an object a is "a+1; a*b; a=c". Then, the serial code means that these operations "a+1, a*b, and a=c" run in series, that is, in an execution phase of code, first, the operation "a+1" is performed on the object a, then, the operation "a*b" is performed on the object a, and finally, the operation "a=c" is performed on the object a. The parallel code means that operation code associated with an object runs in parallel. The foregoing example is still used, and the operation code of the object a is "a+1; a*b; a=c". The parallel code means that these operations "a+1, a*b, and a=c" run in parallel, that is, in the execution phase of the code, these operations "a+1, a*b, and a=c" are simultaneously performed on the object a.

Because the source code that is input by the programmer is a high level language, a terminal cannot recognize the source code. Therefore, in a compiling phase, the high level language, that is, the source code, input by the programmer still needs to be specifically converted into machine-recognizable binary code, that is, target code. In addition, to help manage a memory, a counter is further set for each object, and a counting rule, a locking rule, and an unlocking rule is set for the counter in the compiling phase.

The counting rule of the counter may be specifically as follows: When it is detected that a corresponding object is operated by a thread, a value of the counter increases by 1; and when it is detected that a corresponding object is released by a thread, a value of the counter decreases by 1, and when a value of a counter of an object is 0, memory space occupied by the object is released.

The locking rule for the counter may be specifically as follows: When it is detected that a current object is operated by a thread, the counter is locked, and in this case, threads other than the current thread cannot operate the object.

The unlocking rule may be specifically as follows: When it is detected that the current object is released by the foregoing thread, the counter is unlocked, and in this case, any thread can operate the current object.

In the execution phase of the code, the foregoing terminal may specifically execute the target code to implement a corresponding function. It can be learned from the foregoing description that, the source code that is input by the programmer mainly includes the object and the operation code. After the source code is compiled, the target code also mainly includes an object and operation code, and the operation code may also be specifically serial code or parallel code. In addition, multiple threads may simultaneously run in the terminal, the thread is a minimum unit of a program execution stream in the terminal, and a standard thread may include a thread ID, a current instruction pointer, a register set, and a stack. Therefore, the operation code may be specifically allocated to different threads in the terminal for running. It is assumed that operation code of an object a is allocated to a thread 1 for running, and when the thread 1 cites the object a, a processing procedure of the operation code for a counter of the object a is specifically as follows: a locking operation is performed on the counter of the object a, and a value of the counter increases by 1. However, after an operation of the thread 1 on the object a is completed, a value of the counter decreases by 1, and then an unlocking operation is performed on the counter of the object a. After the locking operation is performed on the counter of the object a, another thread cannot perform an operation on the object a. After the unlocking operation is performed on the counter of the object a, the another thread can perform an operation on the object a.

It can be learned from the foregoing description that, performing the locking operation and the unlocking operation on the counter of the object is mainly intended to ensure exclusivity of each thread for an operation object at one moment. However, the serial code is code that runs in series, that is, there is only one operation code that performs an operation on the object at each moment. Correspondingly, when the serial code is allocated to different threads, there is also only one thread that performs an operation on the object at each moment. Therefore, it can be learned that there is no need to perform the locking operation and the unlocking operation on a counter of the object of the serial code.

Embodiment 1

Figure 2:
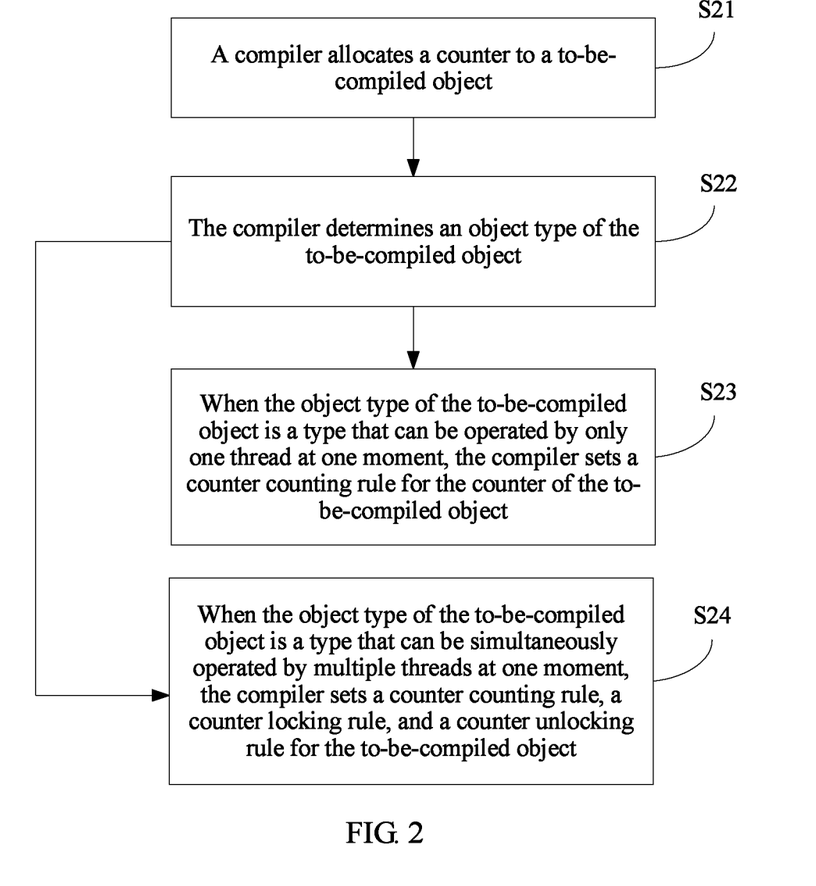
FIG. 2 is a schematic flowchart of a method for compiling a source code object according to an embodiment of the present invention.

Based on the foregoing application scenario, the present invention provides a method for compiling a source code object. A type of each object is preset according to operation code of each object in source code. For example, when operation code associated with an object in the source code is serial code, an object type of the object may be set as a type that can be operated by only one thread at one moment; and when operation code associated with an object is parallel code, an object type of the object may be set as a type that can be simultaneously operated by multiple threads at one moment. Based on type division for the object in the source code, for a to-be-compiled object in the source code, as shown in FIG. 2, the object may be compiled by specifically using the following method.

Step S21. A compiler allocates a counter to a to-be-compiled object.

The compiler and the foregoing terminal running compiling software may be specifically a same terminal, and the terminal may be specifically a computer, a server, or the like.

Step S22. The compiler determines an object type of the to-be-compiled object.

The object type of the to-be-compiled object may be a type that can be operated by only one thread at one moment, or a type that can be simultaneously operated by multiple threads at one moment. For type division for the to-be-compiled object, refer to the foregoing description, and details are not described herein again.

Step S23. When the object type of the to-be-compiled object is a type that can be operated by only one thread at one moment, the compiler sets a counter counting rule for the counter of the to-be-compiled object.

Step S24. When the object type of the to-be-compiled object is a type that can be simultaneously operated by multiple threads at one moment, the compiler sets a counter counting rule, a counter locking rule, and a counter unlocking rule for the counter of the to-be-compiled object.

It can be learned from the foregoing description that, in this embodiment of the present invention, the object in the source code is preset, according to the operation code associated with the source code, as the type that can be operated by multiple threads at one moment, or the type that can be operated by only one thread at one moment. For example, when the operation code associated with the object is serial code, the object type of the object is set as the type that can be operated by only one thread at one moment. When the operation code associated with the object is parallel code, the object type of the object is set as the type that can be operated by multiple threads at one moment. In addition, when compiling the object in the source code and determining that a current to-be-compiled object is of the type that can be operated by only one thread at one moment, the compiler sets only a counter counting rule for a counter of the to-be-compiled object, and does not set a counter locking rule and a counter unlocking rule. Relative to the prior art in which a counter counting rule, a counter locking rule, and a counter unlocking rule are set for a counter of each object in the source code, compiling efficiency is improved. Moreover, for an object that is operated by only one thread at one moment, operation code associated with the object is serial code, and then in an execution phase of target code, the foregoing object can be operated by only one thread at one moment. Therefore, using the method of the present invention may also ensure exclusivity of each thread for operation object at any moment. In conclusion, according to the present invention, compiling efficiency can be improved on the basis of ensuring exclusivity of each thread for the operation object.

Embodiment 2

Figure 3:
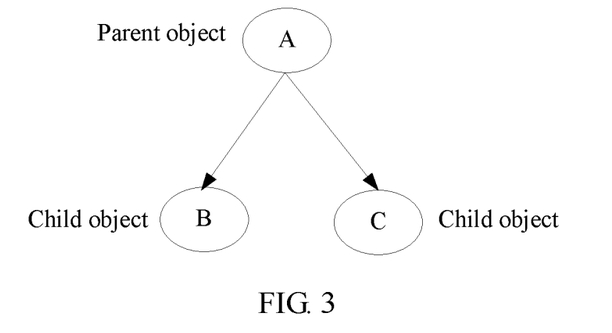
FIG. 3 is a schematic diagram of a parent-child relationship between objects according to an embodiment of the present invention.

In this embodiment of the present invention, there may be a parent-child relationship between objects in source code that is compiled by a programmer, and a child object may inherit a characteristic of a parent object. Therefore, when compiling the source code, the programmer may define only an object type of a parent object, and a child object may inherit an object type of a corresponding parent object. For example, when compiling the source code, as shown in FIG. 3, the programmer sets three objects: an object A, an object B, and an object C respectively, the object A is a parent object, and the object B and the object C are child objects of the object A. Therefore, object types of the object B and the object C are consistent with an object type of the object A, that is, when the object type of the object A is a type that can be operated by only one thread at one moment, the object types of the object B and the object C are also the type that can be operated by only one thread at one moment. When the object type of the object A is a type that can be simultaneously operated by multiple threads at one moment, the object types of the object B and the object C are also the type that can be simultaneously operated by multiple threads at one moment. Correspondingly, when compiling the object, the programmer may define only the object type of the object A. Using the foregoing method may also improve efficiency of the programmer to compile the source code.

Figure 4:
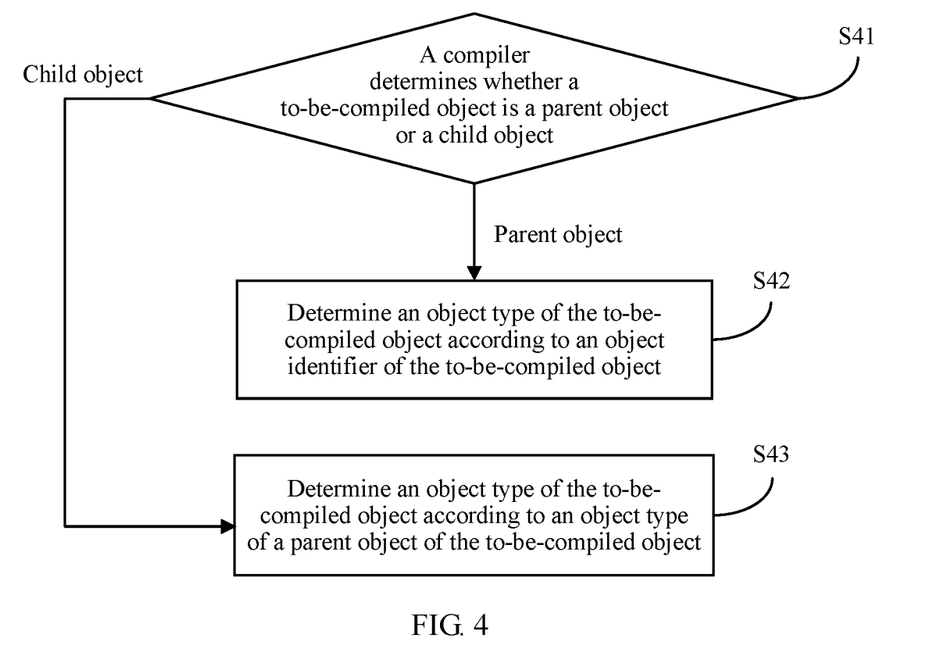
FIG. 4 is another schematic flowchart of a method for compiling a source code object according to an embodiment of the present invention.

In this embodiment of the present invention, when the programmer uses the parent-child relationship to define a type of an object, in a compiling phase, as shown in FIG. 4, step S22 "the compiler determines an object type of the to-be-compiled object" in the foregoing Embodiment 1 may specifically include the following steps.

Step S41. The compiler determines whether the to-be-compiled object is a parent object or a child object.

Optionally, when the to-be-compiled object has an associated child object, the to-be-compiled object is determined as the parent object, and when the to-be-compiled object has an associated parent object, the to-be-compiled object is determined as the child object.

Step S42. When the to-be-compiled object is the parent object, the compiler determines an object type of the to-be-compiled object according to an object identifier of the to-be-compiled object.

Optionally, when compiling the source code, the programmer may specifically set different identifiers for different types of objects, for example, set an @safe identifier for an object of a type that can be simultaneously operated by multiple threads at one moment, and does not set any identifier for an object of a type that can be operated by only one thread at one moment. Therefore, when detecting that the @safe identifier is set for an object, the compiler determines that an object type of the current object is the type that can be simultaneously operated by multiple threads at one moment, and when detecting that there is no identifier for an object, the compiler determines that an object type of the current object is the type that can be operated by only one thread at one moment.

Step S43. When the to-be-compiled object is the child object, the compiler determines an object type of the to-be-compiled object according to an object type of a parent object of the to-be-compiled object.

Optionally, when the to-be-compiled object is the child object, the parent object of the to-be-compiled object may be determined according to the parent-child relationship between objects in the source code, and then the object type of the to-be-compiled object is set to be consistent with the object type of the parent object of the to-be-compiled object. For example, when the object type of the parent object of the to-be-compiled object is the type that can be operated by only one thread at one moment, the object type of the to-be-compiled object may be determined as the type that can be operated by only one thread at one moment, and when the object type of the parent object of the to-be-compiled object is the type that can be simultaneously operated by multiple threads at one moment, the object type of the to-be-compiled object may be determined as the type that can be simultaneously operated by multiple threads at one moment. For details about how to determine the object type of the parent object, refer to the description of the foregoing step S42, and details are not described herein again.

It can be learned from the foregoing description that, in this embodiment of the present invention, when compiling the source code, the programmer may set only the object type of the parent object, and does not need to set the object type for the child object, thereby improving efficiency of the programmer to compile the source code.

Embodiment 3

In this embodiment of the present invention, when compiling source code, a programmer may specifically set an object identifier for each object in the source code. For example, when operation code associated with an object in the source code is parallel code, the programmer may specifically set an object identifier of the object as a first identifier. The first identifier may represent that an object type of a current object is a type that can be simultaneously operated by multiple threads at one moment, and the first identifier may be specifically an identifier such as an @safe character. When operation code associated with an object in the source code is serial code, the programmer may specifically set an object identifier of the object as a second identifier. The second identifier may represent that an object type of a current object is a type that can be operated by only one thread at one moment, and the second identifier may be specifically set by the programmer.

Certainly, in this embodiment of the present invention, the programmer may also set only the first identifier for the object in the source code, and does not set the second identifier; or may set only the second identifier for the object in the source code, and does not set the first identifier, provided that types of different objects can be distinguished by using the object identifier in this embodiment of the present invention.

Figure 5:
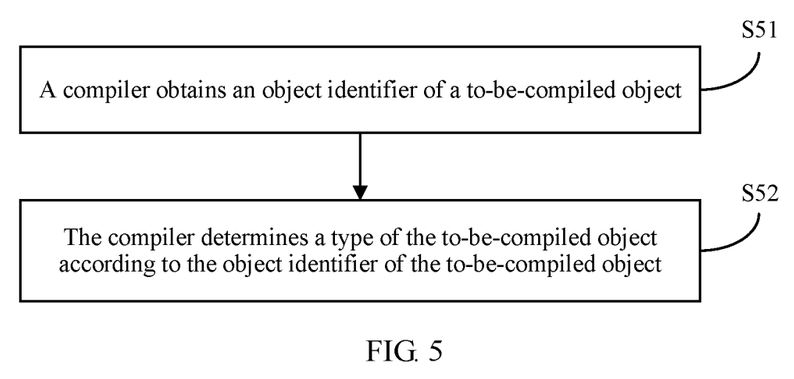
FIG. 5 is still another schematic flowchart of a method for compiling a source code object according to an embodiment of the present invention.

Based on the foregoing setting of the programmer, as shown in FIG. 5, step S22 "the compiler determines an object type of the to-be-compiled object" in the foregoing Embodiment 1 may specifically include the following steps.

Step S51. The compiler obtains an object identifier of the to-be-compiled object.

Step S52. The compiler determines a type of the to-be-compiled object according to the object identifier of the to-be-compiled object.

Optionally, when compiling the source code, the programmer sets the first identifier or the second identifier for each object according to whether the operation code associated with the object is the serial code or the parallel code. Correspondingly, in this embodiment of the present invention, when detecting that an object identifier of a current to-be-compiled object is the first identifier, the compiler may determine that the type of the to-be-compiled object is the type that can be simultaneously operated by multiple threads at one moment, and when detecting that an object identifier of a current to-be-compiled object is the second identifier, the compiler may determine that the type of the to-be-compiled object is the type that can be operated by only one thread at one moment.

Optionally, when compiling the source code, the programmer sets the first identifier only for an object whose associated operation code is the parallel code, and does not set any identifier for an object whose associated operation code is the serial code. Correspondingly, in this embodiment of the present invention, when detecting that an object identifier of a current to-be-compiled object is the first identifier, the compiler determines that the type of the to-be-compiled object is the type that can be simultaneously operated by multiple threads at one moment, and when detecting that no object identifier is set for a current to-be-compiled object, the compiler determines that the type of the to-be-compiled object is the type that can be operated by only one thread at one moment.

Optionally, when compiling the source code, the programmer sets the second identifier only for an object whose associated operation code is the serial code, and does not set any identifier for an object whose associated operation code is the parallel code. Correspondingly, in this embodiment of the present invention, when detecting that an object identifier of a current to-be-compiled object is the second identifier, the compiler determines that the type of the to-be-compiled object is the type that can be operated by only one thread at one moment, and when detecting that no object identifier is set for a current to-be-compiled object, the compiler determines that the type of the to-be-compiled object is the type that can be simultaneously operated by multiple threads at one moment.

It can be learned from the foregoing description that, in this embodiment of the present invention, in a compiling phase, the compiler may determine an object type of each object by presetting different object identifiers for objects in the source code.

Embodiment 4

Figure 6:
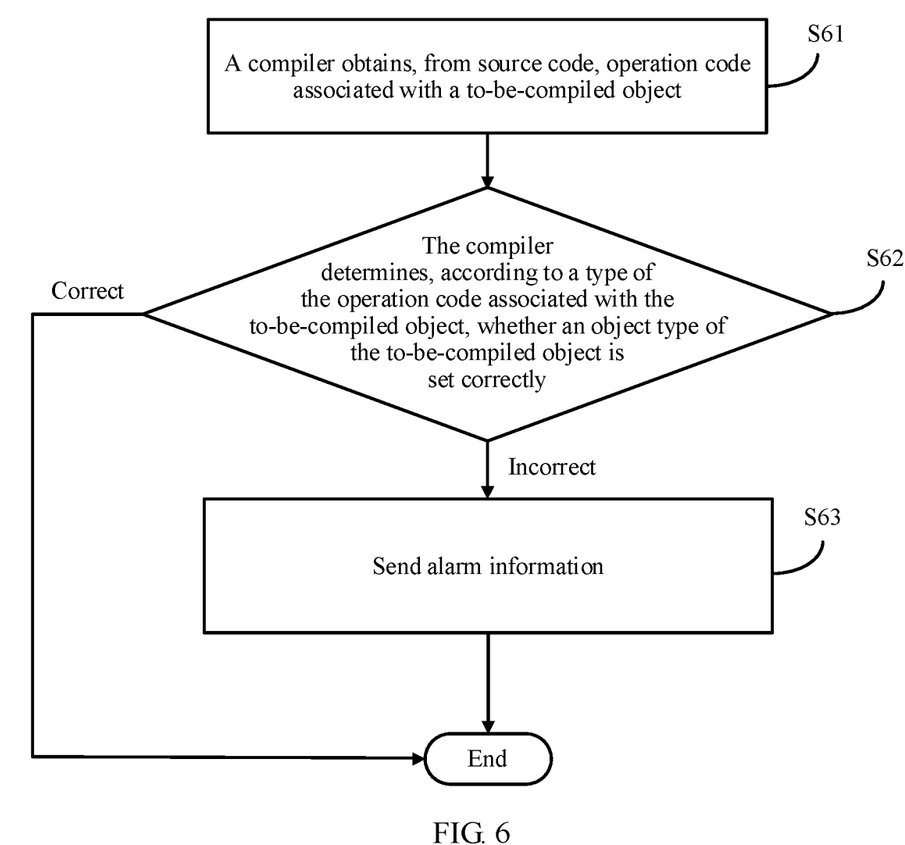
FIG. 6 is yet another schematic flowchart of a method for compiling a source code object according to an embodiment of the present invention.

In this embodiment of the present invention, before a compiler compiles a to-be-compiled object, the compiler may further detect whether an object type of the to-be-compiled object is set correctly, as shown in FIG. 6, and specific steps are as follows:

Step S61. The compiler obtains, from source code, operation code associated with a to-be-compiled object.

Step S62. The compiler determines, according to a type of the operation code associated with the to-be-compiled object, whether an object type of the to-be-compiled object is set correctly. If the object type of the to-be-compiled object is set correctly, the detection ends, and if the object type of the to-be-compiled object is set incorrectly, step S63 is performed.

Step S63. Send alarm information.

It can be learned from the foregoing description that, when operation code associated with an object is serial code, the object type of the to-be-compiled object is a type that can be operated by only one thread at one moment, and when operation code associated with an object is parallel code, the object type of the to-be-compiled object is a type that can be operated by multiple threads at one moment.

Therefore, in this embodiment of the present invention, the compiler may specifically perform an inverse operation on the foregoing process. The compiler first obtains the operation code associated with the to-be-compiled object, and then determines whether the associated operation code is the serial code or the parallel code. If the associated operation code is the serial code, the compiler determines whether the object type of the to-be-compiled object is the type that can be operated by only one thread at one moment, and if the object type of the to-be-compiled object is not the type that can be operated by only one thread at one moment, the compiler sends the alarm information. Likewise, if the associated operation code is the parallel code, the compiler determines whether the object type of the to-be-compiled object is the type that can be operated by multiple threads at one moment, and if the object type of the to-be-compiled object is not the type that can be operated by multiple threads at one moment, the compiler sends the alarm information.

Certainly, in this embodiment of the present invention, if the compiler cannot recognize a to-be-compiled object according to an object identifier of the to-be-compiled object, it indicates that the object identifier that the programmer compiles for the to-be-compiled object does not comply with a preset rule. In this case, the compiler may also send alarm information to notify the programmer to make modification.

It can be learned from the foregoing description that, in this embodiment of the present invention, the compiler may automatically detect the object type of the to-be-compiled object and the identifier of the object type, and when an error occurs during the detection, the compiler generates the alarm information, thereby improving accuracy of the programmer to compile code.

Embodiment 5

In the prior art, a programmer compiles a program mainly in two manners: a non-ownership compiling manner and an ownership compiling manner respectively. For the non-ownership compiling manner, there is no need to define an ownership relationship between objects, and the manner is easy to use and is relatively applicable to compiling serial code. For the ownership compiling manner, an ownership relationship between objects needs to be defined, and one object can be owned by only one other object. The manner is complex to use and is relatively applicable to compiling parallel code.

In this embodiment of the present invention, in a program compiling phase, the programmer may specifically compile the serial code in the non-ownership manner, and does not set any object identifier for an object in the serial code. The programmer may specifically compile the parallel code in the ownership manner, and set an @safe object identifier for an object in the parallel code. For example, an object in the parallel code is an object 1, and then the programmer may specifically use the following manner to compile the object 1: "@safe (object 1)", and an object in the serial code is an object 2, and then the programmer may specifically use the following manner to compile the object 2: "(object 2)".

In this embodiment of the present invention, the compiler may specifically use the following manner to detect code that is compiled by the programmer. The foregoing example is still used. The compiler first obtains operation code associated with the object 1, and then detects whether the operation code associated with the object 1 is consistent with a type of the object 1, for example, detects whether the operation code associated with the object 1 is the parallel code, that is, detects whether a rule for compiling the operation code associated with the object 1 complies with the ownership compiling manner. When the rule for compiling the operation code associated with the object 1 does not comply with the ownership compiling manner, the compiler reports an error. Likewise, the compiler detects whether a rule for compiling operation code associated with the object 2 complies with the non-ownership compiling manner, and when the rule for compiling the operation code associated with the object 2 does not comply with the non-ownership compiling manner, the compiler reports an error.

For example, the operation code associated with the object 1 is as follows:

```
"@safe (object 1);
object 1=value 1;
object 3=object 1;
operate (object 1)"
```

Then, when running to this line of code "operate (object 1)", the compiler reports an error. The operation code associated with the object 1 should be the parallel code, and the rule for compiling the associated code of the object 1 should comply with the ownership compiling manner. For this compiling manner, ownership of an object cannot be transferred. In this line of code "object 3=object 1", ownership of an object 1 has been transferred. Therefore, when executing this line of code "operate (object 1)" again, the compiler finds that the ownership of the object 1 has been transferred, and reports the error.

The foregoing example is still used. After detection of the code compiled by the programmer is completed, the compiler may specifically use the following manner to compile a counter of the object 1 and a counter of the object 2, set an operation rule, a locking rule, and an unlocking rule for the counter of the object 1, and set an operation rule for the counter of the object 2. Specific code is as follows:

```
"@safe (object 1)
lock (object 1 (counter))
operate (object 1 (counter))
unlock (object 1 (counter))"
"(object 2)
operate (object 2 (counter))"
```

Then, in an execution phase of the code, only an operation on the counter is performed for the object 2, and there is no need to perform a locking operation and an unlocking operation on the counter of the object 2. Relative to the prior art in which a locking operation and an unlocking operation are performed on each object, a computing resource is saved.

Embodiment 6

The present invention further provides an object processing method, where the method may be specifically applied to a specific process of compiling source code, and the method is specifically as follows:

A compiler sets a counter for an object.

When a type of the object is a type that can be operated by only one thread at one moment, the compiler performs a counting operation on the counter of the object, and no longer executes a counter locking rule and a counter unlocking rule.

A process in which the compiler performs the counting operation on the counter of the to-be-compiled object, and no longer executes the counter locking rule and the counter unlocking rule may be specifically as follows: When the compiler detects that an object is cited by a thread, a value of the counter increases by 1; and when the compiler detects that an object is released by a thread, a value of the counter decreases by 1, and when a value of the counter of the object is 0, memory space occupied by the to-be-compiled object is released.

When an object type of the object is a type that can be simultaneously operated by multiple threads at one moment, the compiler performs a counter operation on the counter of the object, and executing the counter locking rule and the counter unlocking rule for the counter of the object.

A process of performing a counting operation on the counter of the object, and executing the counter locking rule and the counter unlocking rule for the counter of the object may be specifically as follows: When detecting that an object is cited by a thread, the compiler locks the counter and a value of the counter increases by 1, and in this case, threads other than the current thread cannot operate the to-be-compiled object; and when detecting that the to-be-compiled object is released by the foregoing thread, the compiler unlocks the counter and a value of the counter decreases by 1, and in this case, any thread can cite the current object.

It can be learned from the foregoing description that, in this embodiment of the present invention, for the object whose type is the type that can be operated by only one thread at one moment, in a compiling process, only the counter counting operation is performed on the counter, and there is no need to execute the counter locking rule and the counter unlocking rule. Relative to the prior art in which, for any to-be-compiled object, a counting rule, a counter locking rule, and a counter unlocking rule are executed for the counter of the to-be-compiled object, compiling efficiency of the compiler is improved.

Embodiment 7

Figure 7:
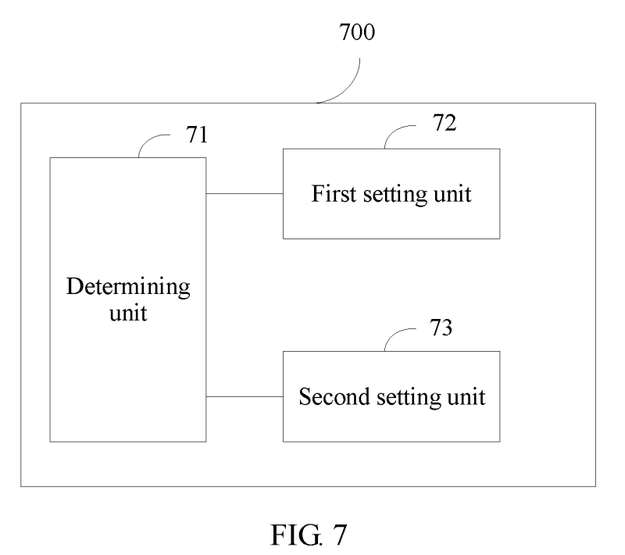
FIG. 7 is a schematic structural diagram of an apparatus for compiling a source code object according to an embodiment of the present invention.

Same as the foregoing conception, the present invention further provides an apparatus for compiling a source code object. As shown in FIG. 7, an apparatus 700 for compiling a source code object includes: a determining unit 71, configured to determine an object type of a to-be-compiled object in source code, where a counter is set for the to-be-compiled object; a first setting unit 72, configured to: when the object type of the to-be-compiled object is a type that can be operated by only one thread at one moment, set a counter counting rule for the counter of the to-be-compiled object; and a second setting unit 73, configured to: when the object type of the to-be-compiled object is a type that can be simultaneously operated by multiple threads at one moment, set a counter counting rule, a counter locking rule, and a counter unlocking rule for the counter of the to-be-compiled object.

Optionally, the determining unit is specifically configured to: determine whether the to-be-compiled object is a parent object or a child object; when the to-be-compiled object is the parent object, determine an object type of the to-be-compiled object according to an object identifier of the to-be-compiled object, where the object identifier is preset for the to-be-compiled object when the source code is compiled; and when the to-be-compiled object is the child object, determine an object type of the to-be-compiled object according to an object type of a parent object of the to-be-compiled object.

Optionally, the determining unit is specifically configured to: obtain the object identifier of the to-be-compiled object, where the object identifier is preset for the to-be-compiled object when the source code is compiled; determine the object type of the to-be-compiled object according to the object identifier of the to-be-compiled object.

Optionally, the apparatus further includes an alarm unit, specifically configured to: obtain, from the source code, operation code associated with the to-be-compiled object; determine, according to a type of the operation code associated with the to-be-compiled object, whether the object type of the to-be-compiled object is set correctly; and send alarm information when the object type of the to-be-compiled object is set incorrectly.

It can be learned from the foregoing description that, in this embodiment of the present invention, the object in the source code is preset, according to the operation code associated with the source code, as the type that can be operated by multiple threads at one moment, or the type that can be operated by only one thread at one moment. For example, when the operation code associated with the object is serial code, the object type of the object is set as the type that can be operated by only one thread at one moment. When the operation code associated with the object is parallel code, the object type of the object is set as the type that can be operated by multiple threads at one moment. In addition, when compiling the object in the source code and determining that a current to-be-compiled object is of the type that can be operated by only one thread at one moment, the compiler sets only a counter counting rule for a counter of the to-be-compiled object, and does not set a counter locking rule and a counter unlocking rule. Relative to the prior art in which a counter counting rule, a counter locking rule, and a counter unlocking rule are set for a counter of each object in the source code, compiling efficiency is improved. Moreover, for an object that is operated by only one thread at one moment, operation code associated with the object is serial code, and then in an execution phase of target code, the foregoing object can be operated by only one thread at one moment. Therefore, using the apparatus of the present invention may also ensure exclusivity of each thread for operation object at any moment. In conclusion, according to the present invention, compiling efficiency can be improved on the basis of ensuring exclusivity of each thread for the operation object.

Embodiment 8

Figure 8:
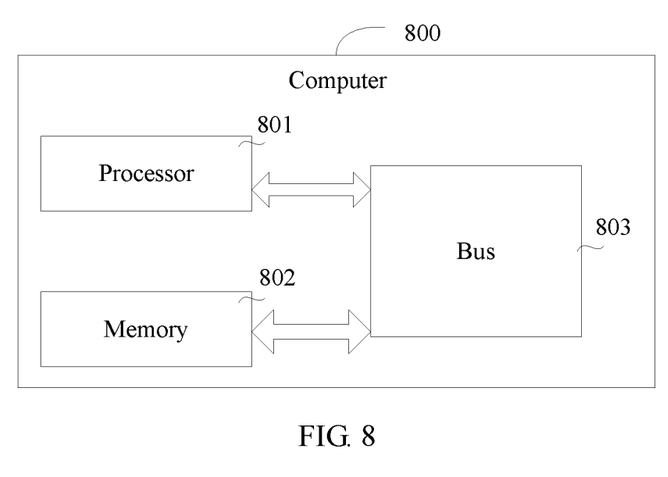
FIG. 8 is a schematic diagram of a computer according to an embodiment of the present invention.

Same as the foregoing conception, the present invention further provides a computer. As shown in FIG. 8, the computer 800 includes at least a processor 801, a memory 802, and a bus 803.

The memory 802 is configured to store a computer executable instruction.

The processor 801 is connected to the memory 802 by using the bus 803, and is configured to execute the computer executable instruction stored in the memory 802, so that the computer 800 executes the foregoing method for compiling a source code object, or executes the foregoing object processing method.

Using a compiler of the present invention may improve compiling efficiency on the basis of ensuring exclusivity of each thread for an operation object.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A method, carried out by a compiler, for compiling objects in a source code, the method comprising:
    first determining, by the compiler, that a to-be-compiled first object in the source code is a first object type that can only be operated by one thread at one moment, wherein a first counter is set for the to-be-compiled first object;
    first setting, by the compiler in response to the first determining, a first counter counting rule for the first counter of the to-be-compiled first object
    second determining, by the compiler, that a to-be-compiled second object in the source code is a second type that can be simultaneously operated by multiple threads, wherein a second counter is set for the to-be-compiled second object; and
    second setting for the second counter, by the compiler, in response to the second determining:
        a second counter counting rule,
        a counter locking rule, and
        a counter unlocking rule,
    wherein the second counting rule increments the second counter when the second object is operated by a thread, the counter locking rule locks the second counter when the second object is operated by the thread and the counter unlocking rule unlocks the second counter when the second object is released by the thread.

2. The method according to claim 1, wherein the first determining comprises:
    determining the to-be-compiled first object is an object type taken from the group consisting of: a parent object, and a child object;
    such that:
        when the to-be-compiled first object is the parent object, determining the first object type of the to-be-compiled first object according to an object identifier of the to-be-compiled first object, wherein the object identifier is an identifier preset for the to-be-compiled first object when the source code is compiled; and
        when the to-be-compiled first object is the child object, determining that the first object type of the to-be-compiled first object is an object type of a parent object of the to-be-compiled first object.

3. The method according to claim 1, wherein the method further comprises:
    obtaining, from the source code, an operation code associated with the to-be-compiled first object;
    determining, according to an operation type of the operation code, the object type of the to-be-compiled first object is not set correctly; and
    sending an alarm information in response to determining the object type of the to-be-compiled first object is not set correctly.

4. A method for processing objects carried out by a compiler, the method comprising:
    first setting a first counter for a first object; and
    first determining that a first object is a first object type that can only be operated by one thread at one moment, and
    in response to the first determining:
        executing a first counter counting rule for the first counter of the first object, and
        skipping performing a counter locking operation and a counter unlocking operation second setting a second counter for a second object; and
    second determining that the second object is a second object type that can be simultaneously operated by multiple threads, and
    in response to the second determining:
        performing a counting operation on the second counter by incrementing the second counter,
        performing a counter locking operation on the second counter when the second object is operated by the thread, and
        performing a counter unlocking operation on the second counter when the second object is released by the thread.

5. An apparatus for compiling a source code, wherein the apparatus comprises:
    a processor; and
    a non-transitory computer-readable medium including computer executable instructions that, when executed by the processor, facilitate carrying out a method for compiling objects in the source code, the method comprising:
        first determining that a to-be-compiled first object in the source code is a first object type that can only be operated by one thread at on moment, wherein a first counter is set for the to-be-compiled first object; and
        first setting, in response to the first determining, a first counter counting rule for the first counter of the to-be-compiled first object
        second determining, by the compiler, that a to-be-compiled second object in the source code is a second type that can be simultaneously operated by multiple threads, wherein a second counter is set for the to-be-compiled second object; and second setting for the second counter, by the compiler, in response to the second determining:
- a second counter counting rule,
- a counter locking rule, and
- a counter unlocking rule,
- wherein the second counting rule increments the second counter when the second object is operated by a thread, the counter locking rule locks the second counter when the second object is operated by the thread and the counter unlocking rule unlocks the second counter when the second object is released by the thread.

6. The apparatus according to claim 5, wherein the first determining comprises:
determining the to-be-compiled first object is an object type taken from the group consisting of: a parent object, and a child object;
such that:
when the to-be-compiled first object is the parent object, determining the first object type of the to-be-compiled first object according to an object identifier of the to-be-compiled first object, wherein the object identifier is an identifier preset for the to-be-compiled first object when the source code is compiled; and
when the to-be-compiled first object is the child object, determining that the object type of the to-be-compiled first object is an object type of a parent object of the to-be-compiled first object.

7. The apparatus according to claim 5, wherein the method carried out by the apparatus further comprises:
obtaining, from the source code, an operation code associated with the to-be-compiled first object;
determining, according to an operation type of the operation code, the object type of the to-be-compiled first object is not set correctly; and sending an alarm information in response to the determining the object type of the to-be-compiled first object is not set correctly.

8. An object processing apparatus, wherein the apparatus comprises:
a processor; and
a non-transitory computer-readable medium including computer executable instructions that, when executed by the processor, facilitate carrying out a method for processing objects in a source code, the method comprising:
first setting a first counter for a first object; and
first determining that a first object is a first object type that can only be operated by one thread at one moment, and
in response to the first determining:
executing a first counter counting rule for the first counter of the first object, and
skipping performing a counter locking operation and a counter unlocking operation second setting a second counter for a second object; and second determining that the second object is a second object type that can be simultaneously operated by multiple threads, and in response to the second determining:

performing a counting operation on the second counter by incrementing the second counter, performing a counter locking operation on the second counter when the second object is operated by the thread, and performing a counter unlocking operation on the second counter when the second object is released by the thread.

\* \* \* \* \*